(12) United States Patent
Nakamura

(10) Patent No.: US 6,182,726 B1
(45) Date of Patent: Feb. 6, 2001

(54) HEAVY DUTY PNEUMATIC TIRE INCLUDING CHAMFERED REGION HAVING A FLAT SURFACE

(75) Inventor: Yoko Nakamura, Kodaira (JP)

(73) Assignee: Bridgestone Corporation, Tokyo (JP)

( * ) Notice: Under 35 U.S.C. 154(b), the term of this patent shall be extended for 0 days.

(21) Appl. No.: 09/123,421

(22) Filed: Jul. 28, 1998

(30) Foreign Application Priority Data

Aug. 7, 1997 (JP) .................................................. 9-212892

(51) Int. Cl.⁷ .............................. B60C 11/11; B60C 11/12; B60C 107/00
(52) U.S. Cl. ................ 152/209.15; 152/209.18; 152/902; 152/DIG. 3
(58) Field of Search .................. 152/209.15, 209.18, 152/902, DIG. 3

(56) References Cited

U.S. PATENT DOCUMENTS

| | | | |
|---|---|---|---|
| 2,670,777 | * 3/1954 | Wallace | ............................ 152/209.15 |
| 4,690,189 | 9/1987 | Bradisse et al. . | |
| 5,690,761 | * 11/1997 | Masaoka . | |
| 5,820,796 | * 10/1998 | Howald et al. . | |
| 6,021,830 | * 2/2000 | Iwamura | .......................... 152/209.15 |

FOREIGN PATENT DOCUMENTS

| | | | |
|---|---|---|---|
| 652119 A1 | 5/1995 | (EP) . | |
| 655353 A1 | 5/1995 | (EP) . | |
| 2720979 A1 | 12/1995 | (FR) . | |
| 1549347 | * 8/1979 | (GB) . | |
| 62-181904 | 8/1987 | (JP) . | |
| 4-197806 | * 7/1992 | (JP) | ................................ 152/209.15 |
| 5-319025 | * 12/1993 | (JP) . | |
| 7-186633 | * 7/1995 | (JP) | ................................ 152/209.15 |
| 7-304309 | 11/1995 | (JP) . | |

* cited by examiner

Primary Examiner—Steven D. Maki
(74) Attorney, Agent, or Firm—Sughrue, Mion, Zinn, Macpeak & Seas, PLLC

(57) ABSTRACT

A heavy duty pneumatic tire has a tread pattern comprising plural block rows, in which each block in at least one block row other than a block row located astride a center of the tread is provided on two corner portions located at a side of a tread end with chamfered regions each gradually decreasing a height of the block toward a tip of the respective corner portion.

2 Claims, 4 Drawing Sheets

FIG_3a
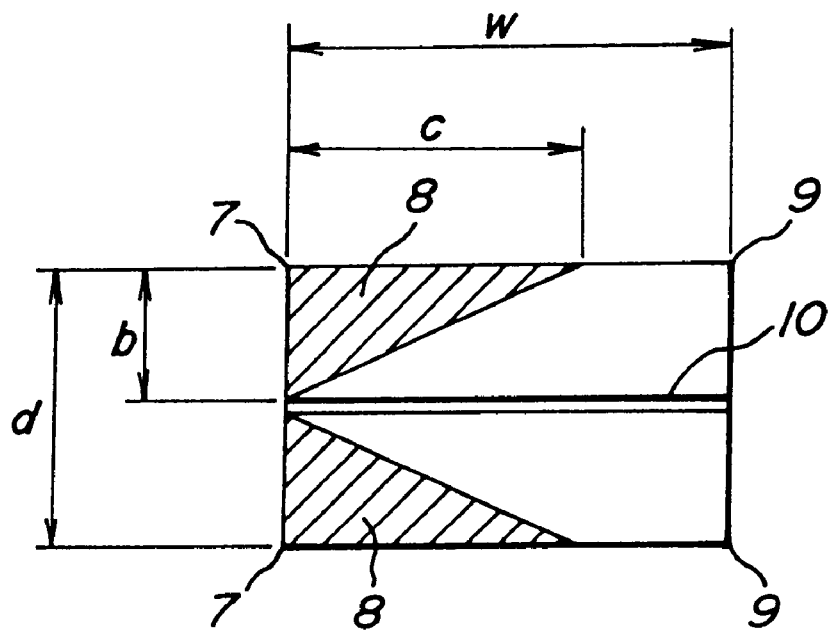
FIG_3b
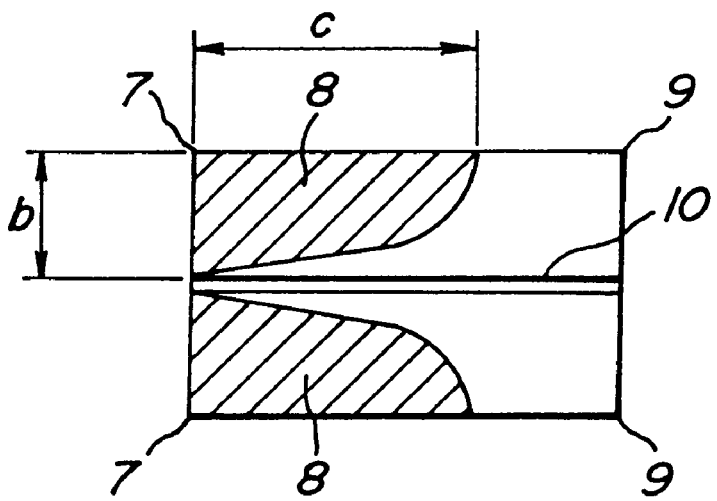

HEAVY DUTY PNEUMATIC TIRE INCLUDING CHAMFERED REGION HAVING A FLAT SURFACE

BACKGROUND OF THE INVENTION

1. Field of the Invention

This invention relates to a heavy duty pneumatic tire for use in heavy vehicles such as truck, bus and the like having an excellent resistance to uneven wear without increasing noise generated, and more particularly to a heavy duty pneumatic tire having a block pattern.

2. Description of Related Art

In the conventional heavy duty pneumatic tire having a block pattern, the occurrence of uneven wear called as heel and toe wear has been controlled by making a worn amount at a stepping-in side portion of the block large and a worn amount at a kicking-out side region of the block small. That is, when only one block b is schematically shown as a perspective view in FIG. 5, it has substantially a semicylindrical shape that an outer profile of the block b at a section perpendicular to a rotating axis of the tire is rendered into an arc shape having a radius of curvature smaller than an outer profile of the tire to lower each of heights at a stepping-in side S and kicking-out side R as compared with the other remaining portion of the block.

In such a conventional technique, it is recognized to improve the heel and toe wear, but when the worn amount at the kicking-out side R is observed in a widthwise direction of the block on and after the middle worn stage, it becomes larger at a side of a tread center rather than at a side of a tread end and hence it is difficult to effectively control the heel and toe wear throughout wear life of the tire. And also, there is a problem that noise is considerably deteriorated as compared with the case of tires not taking the above countermeasure for the uneven wear.

The latter is due to the fact that the stepping-in side portion of the block contacts with ground as a line before the adoption of the countermeasure for the uneven wear but contacts with ground as a plane after the adoption of the above countermeasure.

SUMMARY OF THE INVENTION

It is, therefore, an object of the invention to solve the afore-mentioned problems of the conventional technique and to provide a heavy duty pneumatic tire advantageously improving the resistance to uneven wear from an initial worn stage up to a last worn stage without increasing noise as in a conventional tire.

According to the invention, there is the provision of a heavy duty pneumatic tire comprising block rows defined in a tread by a plurality of circumferential grooves continuously extending in a circumferential direction of the tread and a plurality of lateral grooves preferentially extending in a widthwise direction of the tread and opening to the circumferential grooves, in which each block in at least one block row other than a block row located astride a center of the tread is provided on two corner portions at a side of a tread end and in the circumferential direction with chamfered regions each gradually decreasing a height of the block toward a tip of the respective corner portion.

The word "block row located astride a center of the tread" used herein means a block row of many blocks that the tread center locates at a widthwise center of each of the blocks or in the vicinity of the widthwise center of the block, but does not include a case that the tread center locates in the vicinity of a widthwise end of each block in the block row.

Further, the word "chamfered region" used herein may include an upwardly somewhat convex curved surface in addition to a slantly flat surface.

In the pneumatic tire according to the invention, the occurrence of heel and toe wear can be advantageously controlled at a portion of the block located at the side of the tread end by easily slipping the stepping-in side through the chamfered region formed in the stepping-in side portion likewise the kicking-out side. Wearing in the portion of the block located at the side of the tread center can effectively be controlled by gradually decreasing the chamfered region in the block located at the side of the tread center to relatively increase the ground contact pressure and hardly cause the slippage, and finally the whole of the block can balancedly be worn from an initial stage up to last stage.

Also, in the pneumatic tire according to the invention, the chamfered regions are formed in only two corner portions of the block facing to the side of the tread end, whereby the ground contact form in the kicking-out side of the block, particularly in the portion of the block located at the side of the tread end can be rendered into an approximately linear form to largely reduce the generated noise as compared with the conventional technique.

In such a pneumatic tire, it is preferable that the chamfering length of the block on a side edge located at the side of the tread end, i.e. the length forming the chamfered region is within a range of 0.3–0.5 times the length between both tips of the corner portions in the circumferential direction of the tread as measured from the tip of the corner portion in the circumferential direction.

Furthermore, it is preferable that the chamfering length of the block on a side edge in the widthwise direction of the tread is within a range of 0.2–0.8 times the length between a tip of a corner portion located at the side of the tread end and a tip of a corner portion located at the side of the tread center in the widthwise direction of the tread as measured from the tip of the corner portion located at the side of the tread end in the widthwise direction.

When the chamfering length on the side edge located at the side of the tread end is within a range of 0.3–0.5 times, the slippage at the stepping-in side can be more sufficiently ensured to effectively improve the resistance to uneven wear. That is, when it is less than 0.3 times, the chamfered region is too small and the effect of improving the resistance to uneven wear is less, while when it exceeds 0.5 times, the chamfered regions from both tips of the corner portions are overlapped with each other to lower the effect by the formation of the chamfered region.

When the chamfering length on the side edge in the widthwise direction of the tread is within a range of 0.2–0.8 times, the increase of the generated noise can be prevented while sufficiently ensuring the slippage at the stepping-in side. That is, when it is less than 0.2 times, the chamfered region is too small and the occurrence of uneven wear can not be decreased to an expected level. When it exceeds 0.8 times, the chamfered region is too large and the increase of the generated noise can not be avoided.

In the pneumatic tire according to the invention, it is preferable that a decreasing quantity of the block height in the chamfered region is within a range of 0.5–3.0 mm, whereby the slippage of the block at the stepping-in side is more sufficient. When the decreasing quantity of the block height is less than 0.5 mm, it is difficult to provide the slipping easiness of the block at the stepping-in side. When it exceeds 3.0 mm, the decreasing quantity of the block volume is too large and it may be inconvenient from a viewpoint of total service life of the tire even if the effect of improving the resistance to uneven wear is expected.

More preferably, a fine groove extending in parallel to the lateral groove and having depth and width fairly smaller than those of the other groove is formed in a highest portion of the block. In this case, the drainage property and function of cutting water film are enhanced by the fine groove itself and the edge thereof to more improve the wet performance of the tire.

BRIEF DESCRIPTION OF THE DRAWINGS

The invention will be described with reference to the accompanying drawings, wherein:

FIG. 3A is a schematically plan view illustrating a form of a chamfered region;

FIG. 3B is a schematically plan view illustrating another form of a chamfered region;

DESCRIPTION OF PREFERRED EMBODIMENTS

Figure 1:
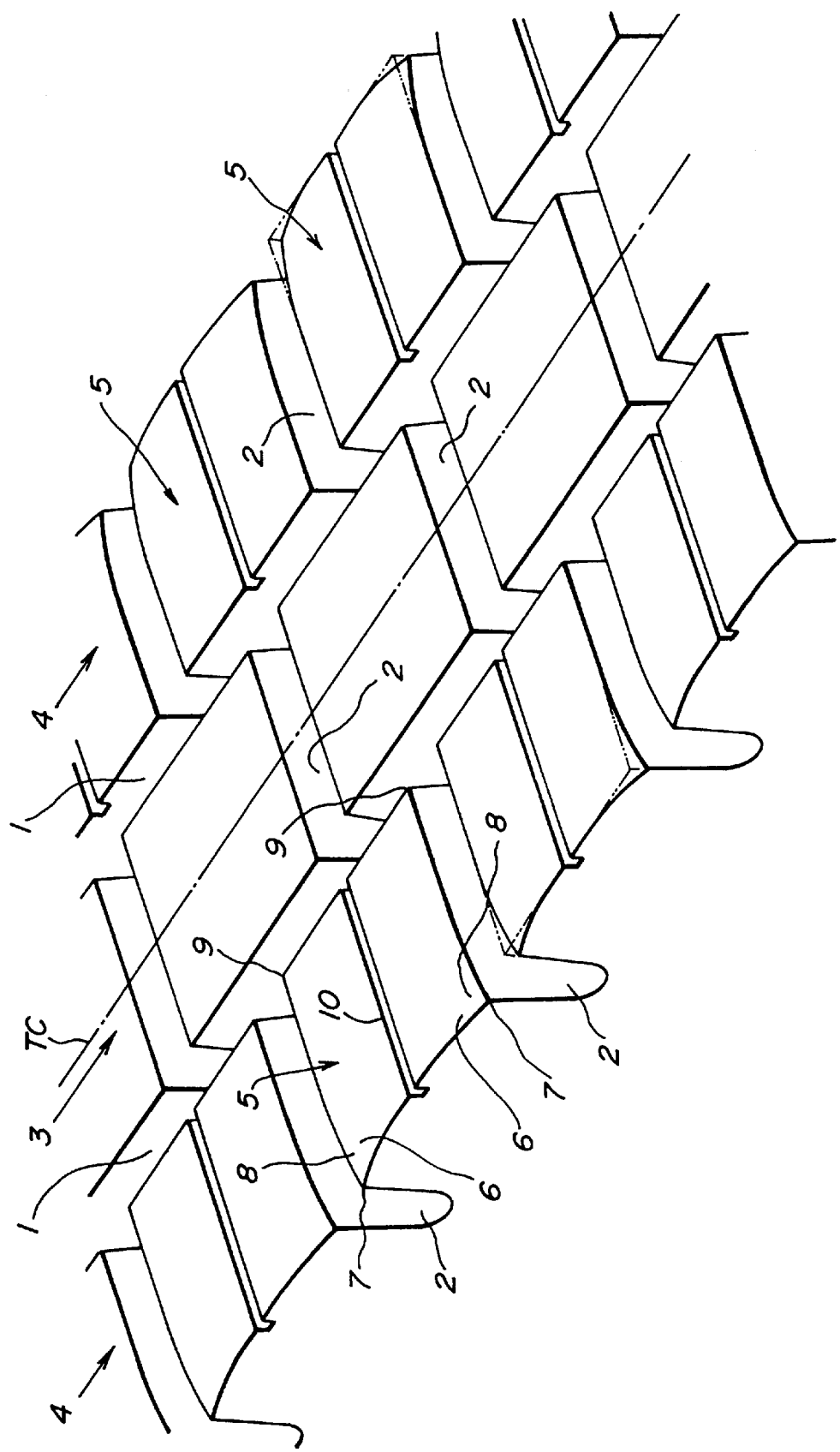
FIG. 1 is a schematically perspective view of an embodiment of the tread pattern according to the invention.

In FIG. 1 is schematically and perspectively shown plural blocks in an embodiment of the pneumatic tire according to the invention.

Plural block rows 3, 4 are defined in a tread portion by arranging plural circumferential grooves 1 so as to continuously extend straightforward or zigzag in a circumferential direction of the tread and arranging a plurality of lateral grooves 2 so as to preferentially extend in a widthwise direction of the tread and open to the circumferential groove 1. Among these block rows 3, 4, each of blocks 5 in the two block rows 4 other than the block row 3 located astride a tread center TC is provided on two corner portions 6 at a side of a tread end and in the circumferential direction with chamfered regions 8 each gradually decreasing a height of the block toward a tip 7 of the respective corner portion 6.

In this case, the chamfered region 8 is a slantly flat surface or may be an upward convex curved surface.

Figure 2:
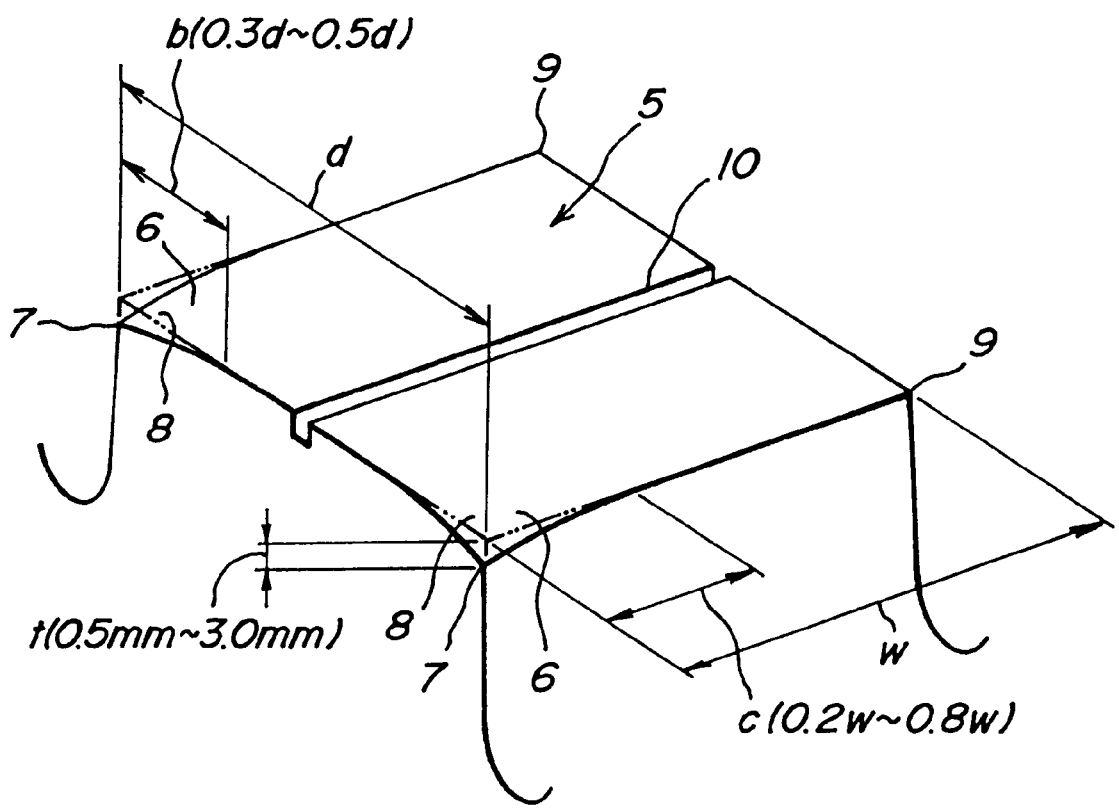
FIG. 2 is a schematically perspective view illustrating a favorable region forming a chamfered region.

As shown in FIG. 2 relating to one block 5, a zone forming the chamfered region 8 is preferable to be a zone located toward a side of a tip from a line segment connecting terminal positions of chamfering lengths b, c to each other in form of a straight line or a line convexly curved inward or outward to a corner portion 6 when the chamfering length b on a side edge located at the side of the tread end is within a range of 0.3–0.5 times a length d between tips 7 of both corner portions 6 in the circumferential direction of the tread as measured from the tip 7 in the circumferential direction, and the chamfering length c on a side edge in the widthwise direction of the tread is within a range of 0.2–0.8 times a length w between a tip 7 of a corner portion located at the side of the tread end and a tip 9 of a corner portion located at the side of the tread center in the widthwise direction of the tread as measured from the tip 7 of the corner portion in the widthwise direction. FIGS. 3a and 3b are schematically plan views illustrating embodiments of the zone forming the chamfered region 8 as a shadowed zone. When the zone forming the chamfered region 8 is made sufficiently large by rendering the line segment between the terminal positions of the chamfering lengths b, c into a convex form outward to the corner portion as shown in FIG. 3b, it is possible to further improve the resistance to uneven wear while effectively reducing the generated noise.

In the chamfered region 8, it is favorable that a maximum decreasing quantity t of the block height is within a range of 0.5–3.0 mm.

On the other hand, it is favorable that a fine groove 10 is formed in a highest portion of the block 5 to extend substantially in parallel to the lateral groove 2.

In the heavy duty pneumatic tire having the structure as mentioned above, the occurrence of heel and toe wear is effectively controlled from an initial wear stage to a last worn stage and also each of the blocks can be worn substantially equally in the widthwise direction. Furthermore, the generated noise can largely be reduced by specifying the zone forming the chamfered region 8 as compared with the conventional technique.

These effects become particularly remarkable when the chamfering length b on the side edge located at the side of the tread end from the tip 7 is 0.3d–0.5d, the chamfering length c on the side edge in the widthwise direction of the tread from the tip 7 is 0.2w–0.8w and the maximum decreasing quantity of the block height is 0.5–3.0 mm.

Moreover, when the fine groove 10 is formed in the highest portion of the block, the wet performance of the tire can be further enhanced.

The following examples are given in illustration of the invention and are not intended as limitations thereof.

EXAMPLE 1

An invention tire will be described with respect to the resistance to uneven wear and the generated noise.

There are provided an invention tire, conventional tire and comparative tire each having a tire size of 11R22.5, respectively. After each of these tires is mounted onto a standard rim and inflated under an internal pressure of 7.00 kgf/cm$^2$, the resistance to uneven wear is evaluated by measuring a stepwise worn quantity of heel and toe wear produced in the tire block after the actual running over a distance of 60000 km, and the generated noise is evaluated by measuring a sound pressure level of the generated noise through a measuring device arranged on a position apart from the tire by 3 m in the test of running the tire on a drum.

Figure 4:
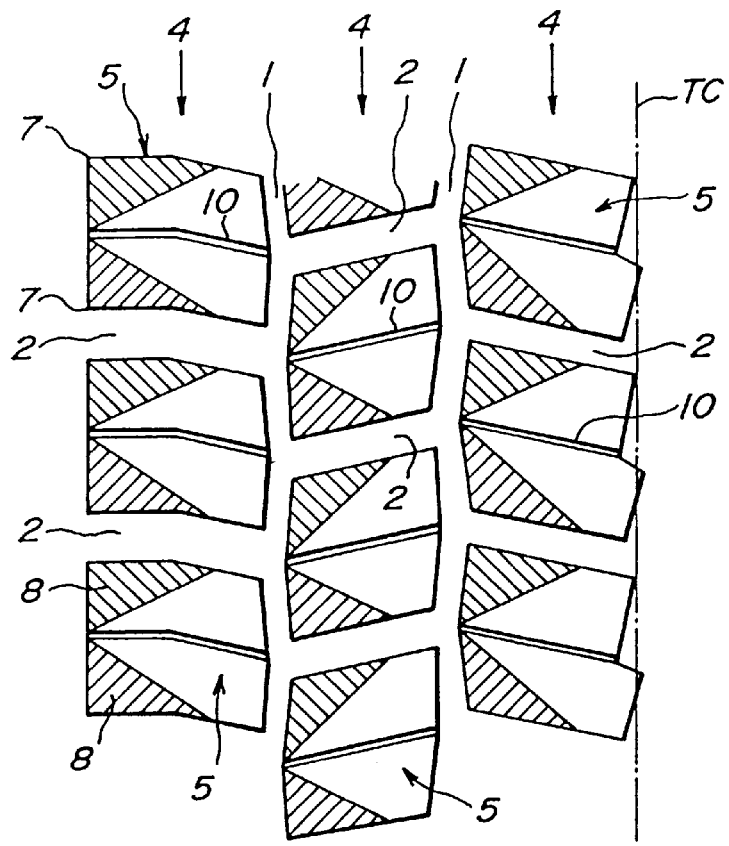
FIG. 4 is a schematic view of a block pattern in an embodiment of the pneumatic tire according to the invention.
Figure 5:
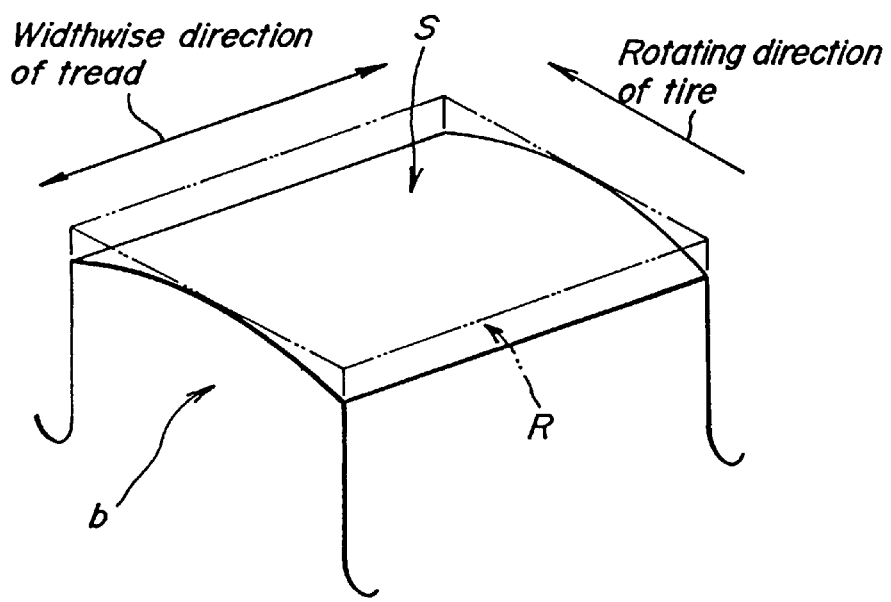
FIG. 5 is a schematically perspective view of a block form in the conventional tire.

The invention tire has a half of a block pattern shown in FIG. 4 having a shadowed chamfered region 8 in each block 5, in which b, c and t as shown in FIG. 2 are b=0.4d, c=0.5w and t=1.0 mm. The conventional tire has a block pattern shown in FIG. 4, provided that each of the blocks 5 has a substantially a semicylindrical form as shown in FIG. 5. The comparative tire is the same as the invention tire except that the chamfered region 8 is not formed in each block.

The measured results are shown in Table 1, which are represented by an index on the basis that the comparative tire is 100. The smaller the index value, the better the result.

TABLE 1

|  | Conventional tire | Invention tire | Comparative tire |
|---|---|---|---|
| Resistance to uneven wear | 70 | 55 | 100 |
| Generated noise | 110 | 100 | 100 |

As seen from the results of Table 1, the invention tire largely improves the resistance to uneven wear as compared with the other tires and reduces the generated noise by about 10% as compared with the conventional tire and equal to that of the comparative tire.

EXAMPLE 2

In this example, the influence of the zone forming the chamfered region upon the wear resistance and the generated noise will be described.

The evaluations of the resistance to uneven wear and the generated noise are the same as in Example 1.

In each tire, the chamfering lengths b, c are changed as shown in Table 2, and also the decreasing quantity t of block height is changed as shown in Table 3. Moreover, the chamfered region 8 has a plain profile of a triangular form.

The results are shown in Tables 2 and 3.

TABLE 2

| | b/d = 0.4, t = 1.0 | | | | | c/w = 0.5, t = 1.0 | | | | |
|---|---|---|---|---|---|---|---|---|---|---|
| | c/w = 0.1 | c/w = 0.2 | c/w = 0.5 | c/w = 0.8 | c/w = 0.9 | b/d = 0.2 | b/d = 0.3 | b/d = 0.4 | b/d = 0.5 | b/d = 0.6 |
| Resistance to uneven wear | 100 | 80 | 55 | 60 | 60 | 100 | 80 | 55 | 55 | 70 |
| Generated noise | 100 | 100 | 100 | 100 | 110 | 100 | 100 | 100 | 100 | 107 |

TABLE 3

| | b/d = 0.4, c/w = 0.5 | | | | |
|---|---|---|---|---|---|
| Decreasing quantity of block height | 0.3 | 0.5 | 1.5 | 3.0 | 3.5 |
| Resistance to uneven wear | 100 | 70 | 55 | 55 | 55 |
| Generated noise | 100 | 100 | 100 | 100 | 110 |
| Estimated distance up to complete wearing | 105 | 100 | 83 | 87 | 105 |

As seen from Tables 2 and 3, the excellent results are obtained in the tire satisfying b=0.3–0.5d, c=0.2–0.8w and t=0.5–3.0 mm.

As mentioned above, according to the invention, the wearing of the block as a whole can be balancedly attained from an initial worn stage to a last worn stage without increasing the generated noise.

What is claimed is:

1. A heavy duty pneumatic tire comprising: block rows defined in a tread by a plurality of circumferential grooves continuously extending in a circumferential direction of the tread and a plurality of lateral grooves extending in a widthwise direction of the tread and opening to the circumferential grooves, wherein each block in at least one block row other than a block row located astride a center of the tread is provided on its two corner portions at a side of a tread end and in the circumferential direction with chamfered regions each gradually decreasing a height of the block toward a tip of the respective corner portions, and the chamfered region has a flat surface such that (1) a chamfering length of the block on a side edge located at the side of the tread end is within a range of 0.3–0.5 times the length between both tips of the corner portions in the circumferential direction of the tread as measured from the tip of the corner portion in the circumferential direction, (2) a chamfering length of the block on a side edge in the widthwise direction of the tread is within a range of 0.2–0.8 times the length between a tip of a corner portion located at the side of the tread end and a tip of a corner portion located at the side of the tread center in the widthwise direction of the tread as measured from the tip of the corner portion located at the side of the tread end in the widthwise direction, and (3) a decreasing quantity of the block height in the chamfered region is within a range of 0.5–3.0 mm.

2. A heavy duty pneumatic tire according to claim 1, further comprising a fine groove extending in parallel to the lateral groove formed in a highest portion of the block.

* * * * *